United States Patent
Demizu et al.

(10) Patent No.: US 12,187,291 B2
(45) Date of Patent: Jan. 7, 2025

(54) CONTROL DEVICE FOR VEHICLE, CONTROL METHOD FOR VEHICLE, AND CONTROL PROGRAM FOR VEHICLE

(71) Applicant: TOYOTA JIDOSHA KABUSHIKI KAISHA, Toyota (JP)

(72) Inventors: Yoshifusa Demizu, Susono (JP); Shoichiroh Morioka, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 287 days.

(21) Appl. No.: 17/670,875

(22) Filed: Feb. 14, 2022

(65) Prior Publication Data

US 2022/0281462 A1    Sep. 8, 2022

(30) Foreign Application Priority Data

Mar. 3, 2021 (JP) ................. 2021-033871

(51) Int. Cl.
*B60W 40/09* (2012.01)
*B60W 50/10* (2012.01)
*G06V 20/58* (2022.01)

(52) U.S. Cl.
CPC ............ *B60W 40/09* (2013.01); *B60W 50/10* (2013.01); *G06V 20/58* (2022.01); *B60W 2554/4041* (2020.02); *B60W 2554/4049* (2020.02)

(58) Field of Classification Search
CPC ............... B60W 40/09; B60W 50/10; B60W 2554/4041; B60W 2554/4049; B60W 50/16; B60W 2540/18; B60W 2552/53; B60W 30/12; B60W 10/04; B60W 10/18; B60W 10/20; B60W 2420/42; B60W 2420/52; B60W 2520/10; B60W 2520/105; B60W 2520/14; B60W 2520/28; B60W 2552/50; B60W 2554/40; G06V 20/58; G06V 20/588; B62D 15/025; G05D 1/0088; G08G 1/167; G08G 1/096725;
(Continued)

(56) References Cited

U.S. PATENT DOCUMENTS 10,480,948 B2 * 11/2019 Olsson .................... G01C 21/30
10,780,916 B2 * 9/2020 Tatsukawa ............... B62D 6/00
(Continued)

FOREIGN PATENT DOCUMENTS

| JP | 2010-030386 A | 2/2010 |
| JP | 2011-512283 A | 4/2011 |
| JP | 2015-205558 A | 11/2015 |

*Primary Examiner* — Steven B Theriault
(74) *Attorney, Agent, or Firm* — Dinsmore & Shohl LLP

(57) ABSTRACT

A control device executes: a process of calculating a boundary line based on information on an environment around the vehicle such that the boundary line is set at a predetermined position distanced from a recognized object around the vehicle; a process of determining whether the vehicle is traveling in a direction to approach the boundary line, based on information on a running state of the vehicle; and a process of generating a reaction force to an operation on a steering device of the vehicle by a driver in the direction to approach the boundary line such that the reaction force corresponds to a relative position of the vehicle to the boundary line, the process being executed in a case where an affirmative determination is made in the process of determining.

5 Claims, 11 Drawing Sheets

(58) Field of Classification Search
CPC ............ G01C 21/3644; G01C 21/3647; G01C 21/3815; G01C 21/3819; G01C 21/3691
See application file for complete search history.

(56) References Cited

U.S. PATENT DOCUMENTS

| | | | | |
|---|---|---|---|---|
| 2009/0024279 | A1* | 1/2009 | Takeda | B62D 6/008 |
| | | | | 701/41 |
| 2010/0030426 | A1* | 2/2010 | Okita | B60W 40/072 |
| | | | | 701/41 |
| 2011/0231095 | A1* | 9/2011 | Nakada | B60W 50/0097 |
| | | | | 701/301 |
| 2011/0234390 | A1 | 9/2011 | Danner et al. | |
| 2012/0140039 | A1* | 6/2012 | Ota | B60W 30/12 |
| | | | | 348/148 |
| 2013/0190984 | A1* | 7/2013 | Kawai | B62D 6/00 |
| | | | | 701/41 |
| 2014/0379166 | A1* | 12/2014 | Kaneko | G08G 1/167 |
| | | | | 701/1 |
| 2016/0012300 | A1* | 1/2016 | Tsuruta | G06F 18/22 |
| | | | | 382/104 |
| 2016/0098605 | A1* | 4/2016 | Okada | B60W 30/12 |
| | | | | 382/104 |
| 2017/0072951 | A1* | 3/2017 | Sakaguchi | B60W 30/143 |
| 2017/0249518 | A1* | 8/2017 | Babala | G08G 1/167 |
| 2017/0267286 | A1* | 9/2017 | Takamatsu | B60W 30/12 |
| 2018/0170429 | A1* | 6/2018 | Shimizu | B60W 30/09 |
| 2019/0071094 | A1* | 3/2019 | Nishiguchi | B60W 30/18163 |
| 2019/0147253 | A1* | 5/2019 | Bai | G01S 17/931 |
| | | | | 382/103 |
| 2020/0239071 | A1* | 7/2020 | Lenneman | B62D 15/029 |
| 2020/0276971 | A1* | 9/2020 | Takeda | B60W 30/12 |
| 2021/0181741 | A1* | 6/2021 | Yao | G05D 1/0214 |
| 2021/0213945 | A1* | 7/2021 | Schamburek | B60W 30/18163 |

\* cited by examiner

IN CASE WHERE OPERATION AMOUNT DOES NOT EXCEED THRESHOLD

IN CASE WHERE VEHICLE DEVIATES OPERATION POSITION WITH OPERATION AMOUNT EXCEEDING THRESHOLD

CONTROL DEVICE FOR VEHICLE, CONTROL METHOD FOR VEHICLE, AND CONTROL PROGRAM FOR VEHICLE

CROSS-REFERENCE TO RELATED APPLICATION

This application claims priority to Japanese Patent Application No. 2021-033871 filed on Mar. 3, 2021, incorporated herein by reference in its entirety.

BACKGROUND

1. Technical Field

The present disclosure relates to a control device, a control method, and a control program each for executing a control for driving assist for a vehicle.

2. Description of Related Art

Japanese Unexamined Patent Application Publication No. 2015-205558 (JP 2015-205558 A) describes a running assist device configured to stop steering assist appropriately in response to a steering assist content. The running assist device has different thresholds for lane keeping assist and for lane change assist. The lane keeping assist is to assist steering of a host vehicle so that the host vehicle runs along a driving lane. The lane change assist is to assist the steering of the host vehicle so that the host vehicle changes the driving lane to another lane. The thresholds are used to make a determination to stop the steering assist based on the amount of steering made by a driver of the host vehicle or the duration time of steering made by the driver.

SUMMARY

As a control for driving assist for a vehicle, a control by which lane deviation is prevented (a lane deviation prevention control) is conceivable. This control is executed such that the vehicle is prevented from deviating from a lane by controlling the steering of the vehicle. In the meantime, the driving assist in which the steering of the vehicle is controlled as such is requested by the law to allow override when a steering device provided in the vehicle is operated by a driver to a given degree, so that a driving operation is performed by the driver without execution of driving assist for a steering control.

Accordingly, in a case where the steering device is unintentionally operated by the driver to a given degree due to clouding of consciousness or the like of the driver, the driving assist for the steering of the vehicle might not be executed, so that the vehicle might approach an object around the vehicle and safety for the vehicle might not be secured appropriately.

The present disclosure is accomplished in view of the above problem, and an object of the present disclosure is to propose a control device for a vehicle, a control method for a vehicle, and a control program for a vehicle each of which can restrain a driver's unintentional operation on a steering device and enhance the safety for a vehicle in a case where the vehicle approaches an object around the vehicle.

A control device according to one aspect of this disclosure executes a control for driving assist for a vehicle. The control device executes: a process of acquiring information on an environment around the vehicle; a process of acquiring information on a running state of the vehicle; a process of calculating a deviation boundary line based on the information on the environment such that the deviation boundary line is set at a predetermined position distanced from a recognized object around the vehicle; an approach determination process of determining whether the vehicle is traveling in a direction to approach the deviation boundary line or not, based on the information on the running state; and a process of generating a reaction force to an operation on a steering device of the vehicle by a driver in the direction to approach the deviation boundary line such that the reaction force corresponds to a relative position of the vehicle to the deviation boundary line, the process being executed in a case where an affirmative determination is made in the approach determination process.

The control device may further execute: a first operation determination process of determining whether an operation on the steering device in a direction to separate from the deviation boundary line is performed or not; a second operation determination process of determining whether or not an operation amount of the operation on the steering device in the direction to approach the deviation boundary line is equal to or more than a predetermined threshold; and a process of controlling steering of the vehicle such that the vehicle does not cross the deviation boundary line, the process being executed in a case where an affirmative determination is made in the approach determination process and a negative determination is made in the first operation determination process and the second operation determination process.

A control method according to one aspect of this disclosure includes: a process of acquiring information on an environment around the vehicle; a process of acquiring information on a running state of the vehicle; a process of calculating a deviation boundary line based on the information on the environment such that the deviation boundary line is set at a predetermined position distanced from a recognized object around the vehicle; an approach determination process of determining whether the vehicle is traveling in a direction to approach the deviation boundary line or not, based on the information on the running state; and a process of generating a reaction force to an operation on a steering device of the vehicle by a driver in the direction to approach the deviation boundary line such that the reaction force corresponds to a relative position of the vehicle to the deviation boundary line, the process being executed in a case where an affirmative determination is made in the approach determination process.

The control method may further include: a first operation determination process of determining whether an operation on the steering device in a direction to separate from the deviation boundary line is performed or not; a second operation determination process of determining whether or not an operation amount of the operation on the steering device in the direction to approach the deviation boundary line is equal to or more than a predetermined threshold; and a process of controlling steering of the vehicle such that the vehicle does not cross the deviation boundary line, the process being executed in a case where an affirmative determination is made in the approach determination process and a negative determination is made in the first operation determination process and the second operation determination process.

A control program according to one aspect of this disclosure is a program causing a computer to execute the control method.

In the control device, the control method, and the control program according to this disclosure, a deviation boundary line is calculated for a recognized object around the vehicle. In a case where the vehicle is traveling in the direction to approach the deviation boundary line, a reaction force is generated to the operation on the steering device in the direction to approach the deviation boundary line. Hereby, it is possible to restrain a driver's unintentional operation on the steering device. As a result, it is possible to improve safety for the vehicle.

Further, in a case where the vehicle is traveling in the direction to approach the deviation boundary line and in a case where the operation in the direction to separate from the deviation boundary line is not performed and the operation amount of the steering device is less than the predetermined threshold, the steering of the vehicle may be controlled such that the vehicle does not cross the deviation boundary line. Hereby, it is possible to restrain the driver from unintentionally causing the vehicle to approach an object around the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Outline

Figure 1:
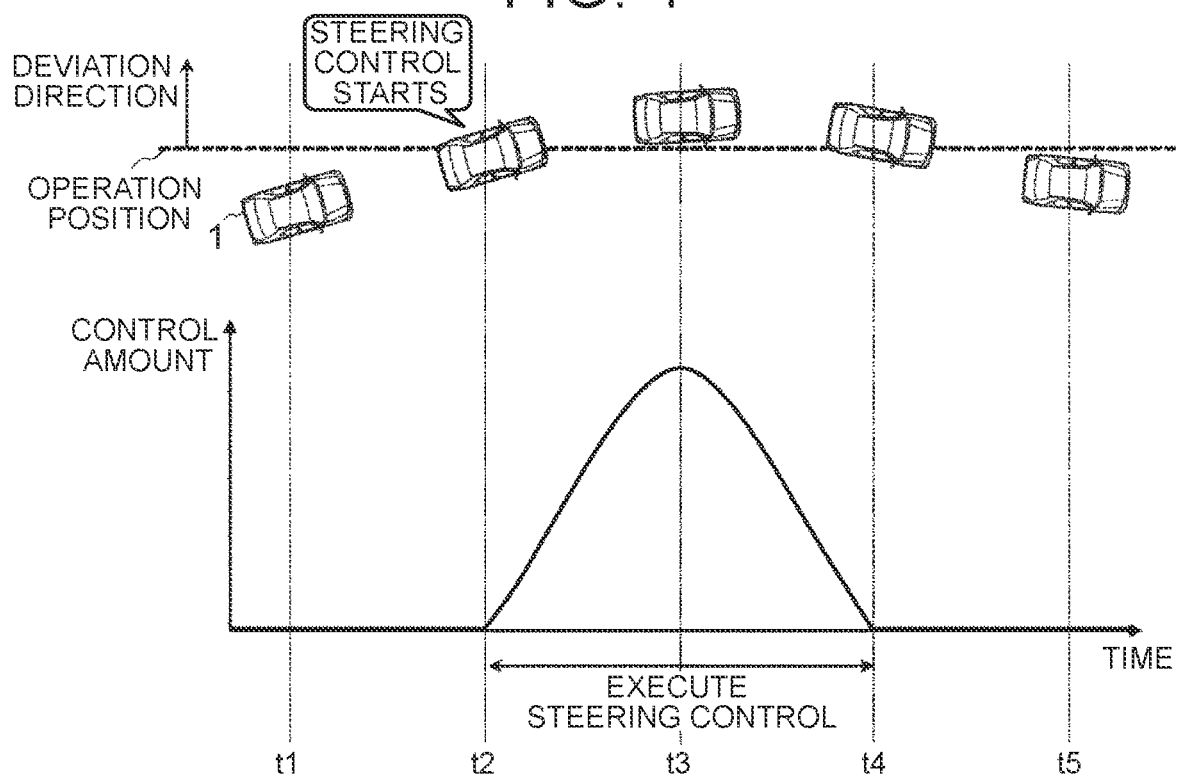
FIG. 1 is a conception diagram to describe driving assist for a vehicle by a steering control.

FIG. 1 is a conception diagram to describe driving assist for a vehicle 1 by a steering control in the related art. FIG. 1 illustrates respective relative positions of the vehicle 1 to an operation position in time t1 to time t5, and respective controlled amounts in a steering control that correspond to the respective relative positions of the vehicle 1 in time t1 to time t5. The steering control of the vehicle 1 is typically executed by a control device provided in the vehicle 1. The steering control is started when the vehicle 1 deviates from the operation position (a broken line) in a deviation direction as illustrated in FIG. 1 (time t2). For example, in a lane deviation prevention control, the operation position is a white line along a lane. When the steering control is executed (from time t2 to time t4), the vehicle 1 can cancel its deviation state from the operation position (time t5).

In a case where the steering control of the vehicle 1 is executed as such, override by a driver of the vehicle 1 is requested by the law. Here, the override indicates that, when a steering device (typically, a steering wheel) provided in the vehicle 1 is operated by the driver to a given degree, a driving operation by the driver is allowed instead of driving assist by the steering control.

Figure 2:
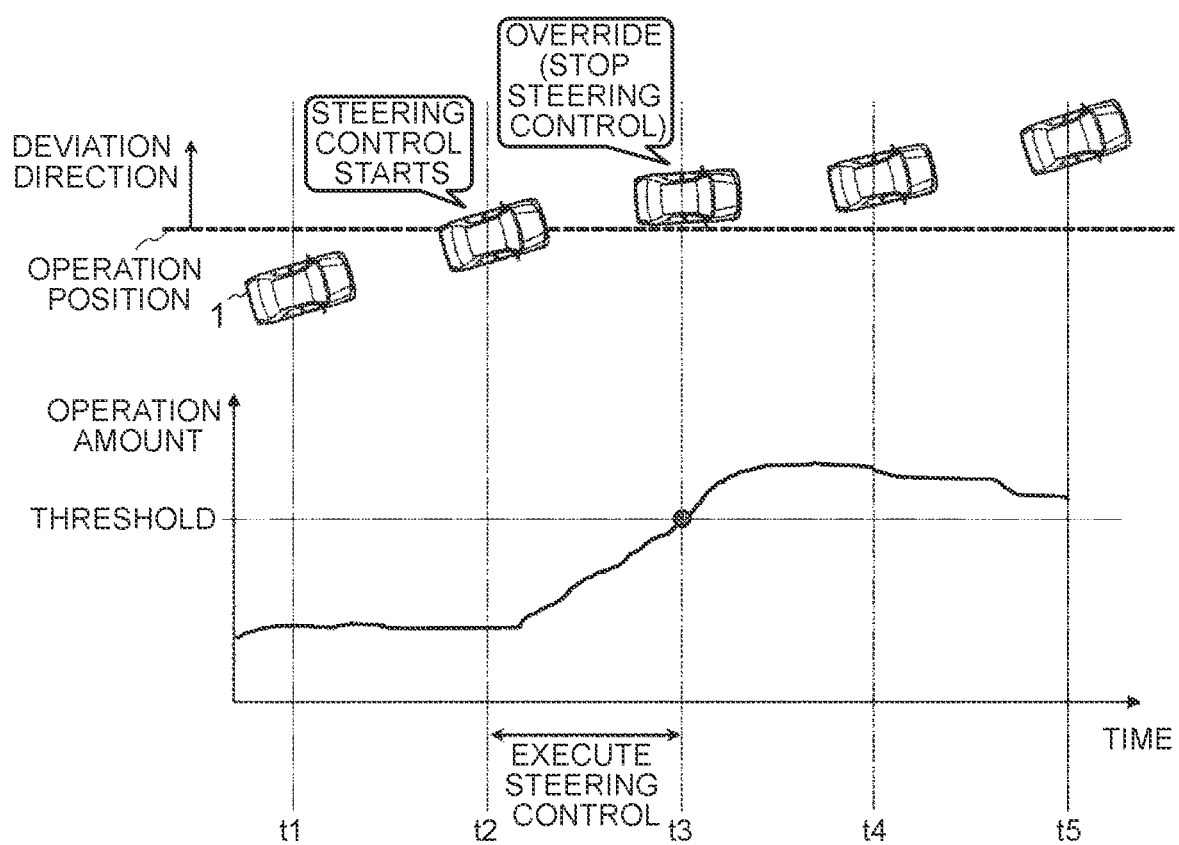
FIG. 2 is a conception diagram to describe override by a driver of the vehicle.

FIG. 2 is a conception diagram to describe override by the driver of the vehicle 1. FIG. 2 illustrates respective relative positions of the vehicle 1 to the operation position in time t1 to time t5, and respective operation amounts of the operation on the steering device to be performed by the driver in time t1 to time t5. In FIG. 2, the steering control is started when the vehicle 1 deviates from the operation position in the deviation direction (time t2), similarly to the case illustrated in FIG. 1. In the meantime, in FIG. 2, the operation amount exceeds a threshold in time t3. Accordingly, the steering control is stopped in time t3, and the driving operation is performed by the driver after that (time t3 to time t5). Note that, in a case where the operation amount exceeds the threshold at the start (time t2) of the steering control, the driving operation by the driver is performed without starting the steering control.

This allows the driving operation by the driver in a case where the driver intentionally drives the vehicle 1 in the deviation direction. For example, the driving operation by the driver is allowed in a case where the driver wants to perform lane-changing or the like.

In the meantime, such a case is also conceivable that the steering device is unintentionally operated by the driver to a given degree due to clouding of consciousness or the like of the driver. In such a case, though the driving operation is unintentionally performed by the driver, the driving assist by the steering control is not performed. On this account, particularly in a case where the vehicle 1 approaches an object around the vehicle 1, it might be difficult to secure safety for the vehicle 1 appropriately.

Figure 3:
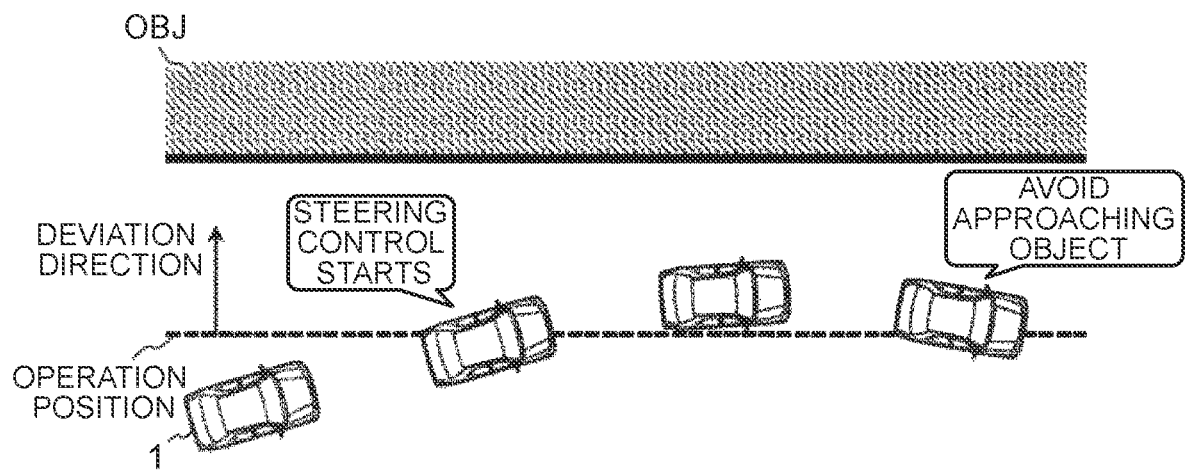
FIG. 3 is a conception diagram illustrating an example of driving assist for the vehicle by the steering control in a case where the vehicle approaches an object as a recognized object around the vehicle.
Figure 3:
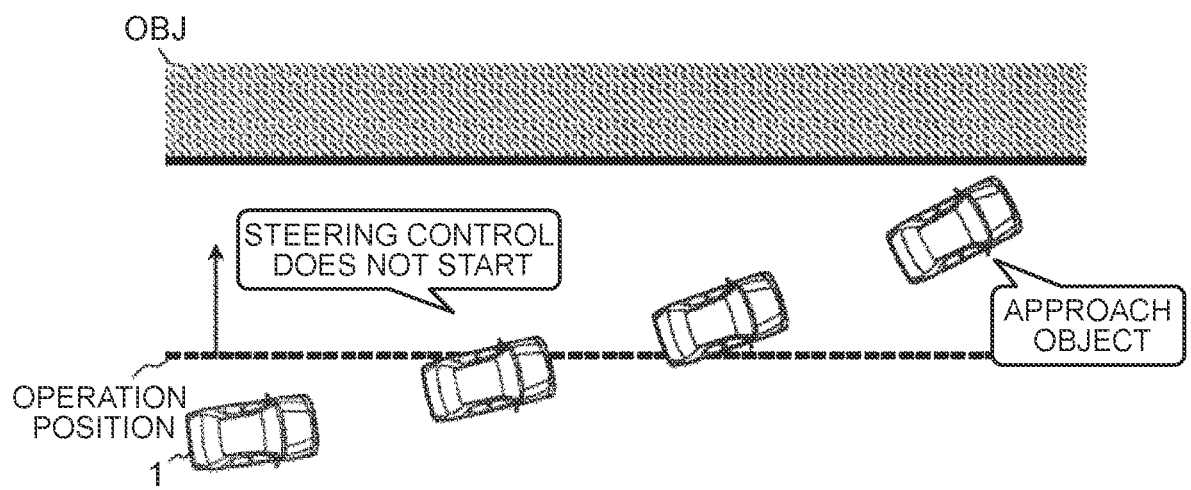

FIG. 3 is a conception diagram illustrating an example of the driving assist for the vehicle 1 by the steering control in a case where the vehicle 1 is approaching an object OBJ as a recognized object around the vehicle 1. The object OBJ is, for example, a wall, a curb stone, a guard rail, or a parked vehicle parked on the shoulder of a road, and the like. That is, FIG. 3 is an example illustrating a case where the vehicle 1 runs in a lane, and when the vehicle 1 runs outside the lane, the vehicle 1 might approach the object OBJ and enter a hazardous situation. The upper side of FIG. 3 illustrates a case where the operation amount of the steering device by the driver does not exceed a threshold, and the lower side of FIG. 3 illustrates a case where the vehicle 1 deviates from the operation position in a state where the operation amount of the steering device by the driver exceeds the threshold.

In the example illustrated on the upper side of FIG. 3, when the vehicle 1 deviates from the operation position in the deviation direction, the steering control is started, so that the vehicle 1 cancels the deviation state from the operation position. Accordingly, it is possible to avoid the vehicle 1 from approaching the object OBJ. In the meantime, in the example illustrated on the lower side of FIG. 3, the steering device is operated by the driver to a given degree, so that the steering control is not started even when the vehicle 1 deviates from the operation position. As a result, the vehicle 1 further approaches the object OBJ. This also applies to a case where the driver unintentionally operates the steering device.

As such, only with the driving assist by the steering control in the related art, it might be difficult to secure safety for the vehicle 1 appropriately in a case where the vehicle 1 is approaching the object OBJ as a recognized object around the vehicle 1 by a driver's unintentional operation on the steering device.

In view of this, the control device of the vehicle 1 according to the present embodiment calculates a deviation boundary line relative to the object OBJ as a recognized object around the vehicle 1. The deviation boundary line is set at a predetermined position distanced from the object OBJ. In a case where the vehicle 1 is determined to be traveling in a direction to approach the deviation boundary line, a control by which reaction force to an operation on the steering device in the direction to approach the deviation boundary line is generated in accordance with a relative position of the vehicle 1 to the deviation boundary line is executed. Further, in a case where the vehicle 1 is traveling in the direction to approach the deviation boundary line and in a case where an operation to separate the vehicle 1 from the deviation boundary line is not performed and the operation amount of the steering device is less than a predetermined threshold, the steering of the vehicle 1 is controlled such that the vehicle 1 does not cross the deviation boundary line.

Figure 4:
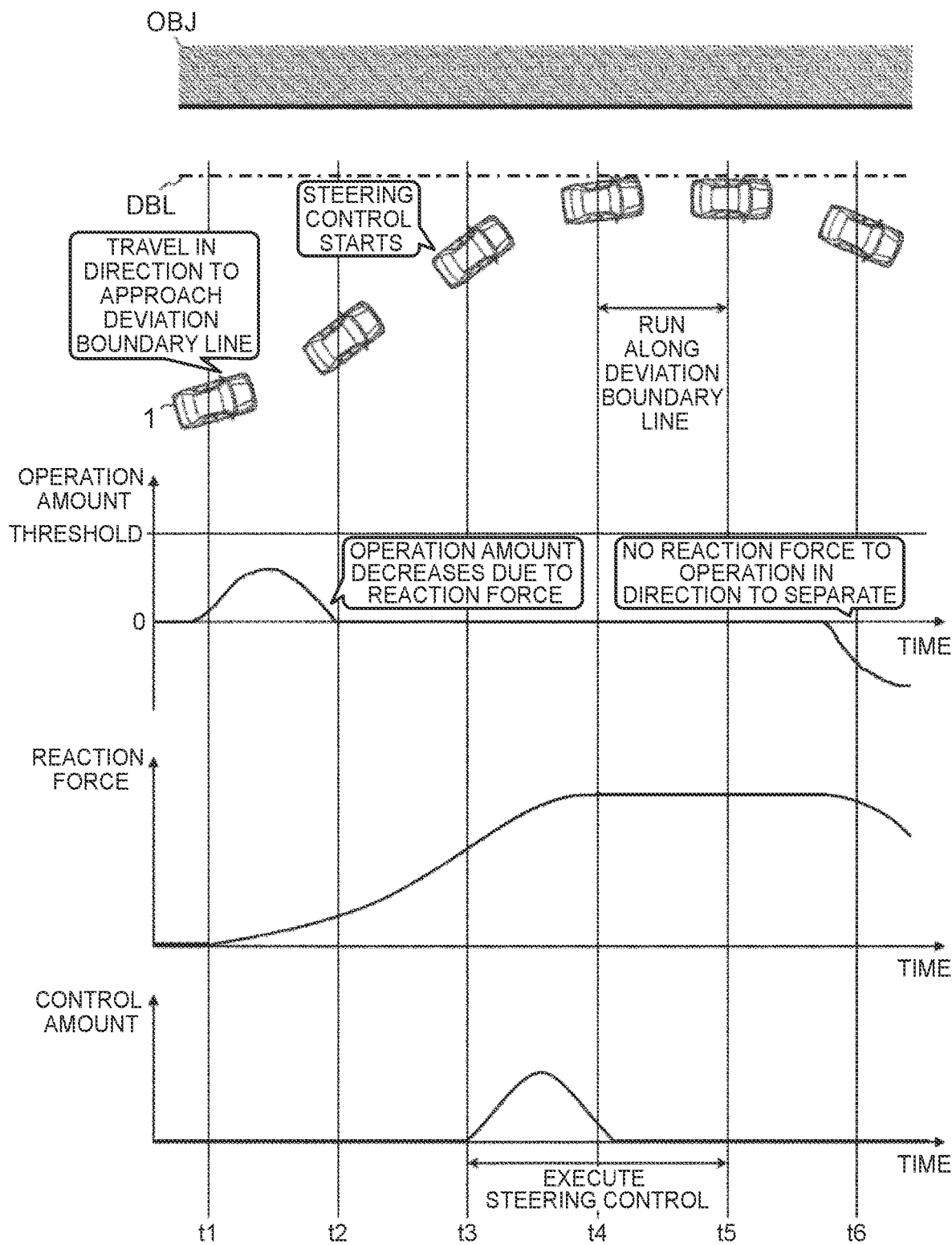
FIG. 4 is a conception diagram to describe an outline of a control to be executed by a control device according to the present embodiment.

FIG. 4 is a conception diagram to describe an outline of a control to be executed by the control device according to the present embodiment. FIG. 4 illustrates respective relative positions of the vehicle 1 to the object OBJ and a deviation boundary line DBL in time t1 to time t6, respective operation amounts of the steering device at the respective relative positions of the vehicle 1 in time t1 to time t6, respective reaction forces (force necessary for the driver to steer the steering device) to be generated to the operation on the steering device at the respective relative positions of the vehicle 1 in time t1 to time t6, and respective controlled amounts in the steering control at the respective relative positions of the vehicle 1 in time t1 to time t6. Note that the operation amount of the steering device is illustrated such that an operation amount in a direction to approach the deviation boundary line DBL is expressed as a positive value, and an operation amount in a direction to separate from the deviation boundary line DBL is expressed as a negative value. Further, the reaction force indicates a reaction force to an operation on the steering device in the direction to approach the deviation boundary line DBL, and a reaction force to an operation on the steering device in the direction to separate from the deviation boundary line DBL is not illustrated herein. Particularly, the reaction force to the operation on the steering device in the direction to separate from the deviation boundary line DBL is not generated.

As illustrated in FIG. 4, the control device according to the present embodiment calculates the deviation boundary line DBL for the object OBJ such that the deviation boundary line DBL is set at a predetermined position distanced from the object OBJ. When the vehicle 1 is traveling in the direction to approach the deviation boundary line DBL by the operation on the steering device (time t1), a reaction force is generated to the operation on the steering device in the direction to approach the deviation boundary line DBL. Hereby, the operation amount in the direction to approach the deviation boundary line DBL is decreased (time t2). Here, a reaction force to be generated in a case where the driver steers the steering device increases as the vehicle 1 approaches the deviation boundary line DBL (time t1 to time t4), so that it is more difficult to perform the operation on the steering device in the direction to approach the deviation boundary line DBL. That is, it is possible to restrain a driver's unintentional operation on the steering device.

When the operation on the steering device in the direction where the vehicle 1 separates from the deviation boundary line DBL is not performed, and the vehicle 1 is further approaching the deviation boundary line DBL, the control device executes a steering control on the vehicle 1 such that the vehicle 1 does not cross the deviation boundary line DBL (time t3 to time t5). Hereby, the vehicle 1 runs along the deviation boundary line DBL without deviating from the deviation boundary line DBL.

At this time, a large reaction force is generated to the operation on the steering device in the direction where the vehicle 1 approaches the deviation boundary line DBL. Accordingly, in order that the driver performs override, it is necessary to input an operation amount equal to or larger than the threshold into the steering device against the reaction force. As a result, it is possible to restrain the vehicle 1 from crossing the deviation boundary line DBL due to driver's unintentional steering of the steering device.

In the meantime, in a case of performing the operation on the steering device in the direction where the vehicle 1 separates from the deviation boundary line DBL (time t6), the operation can be performed without any reaction force.

As such, the control by the control device according to the present embodiment can restrain the driver from unintentionally causing the vehicle 1 to approach the object OBJ as a recognized object around the vehicle 1.

2. Configuration

Figure 5:
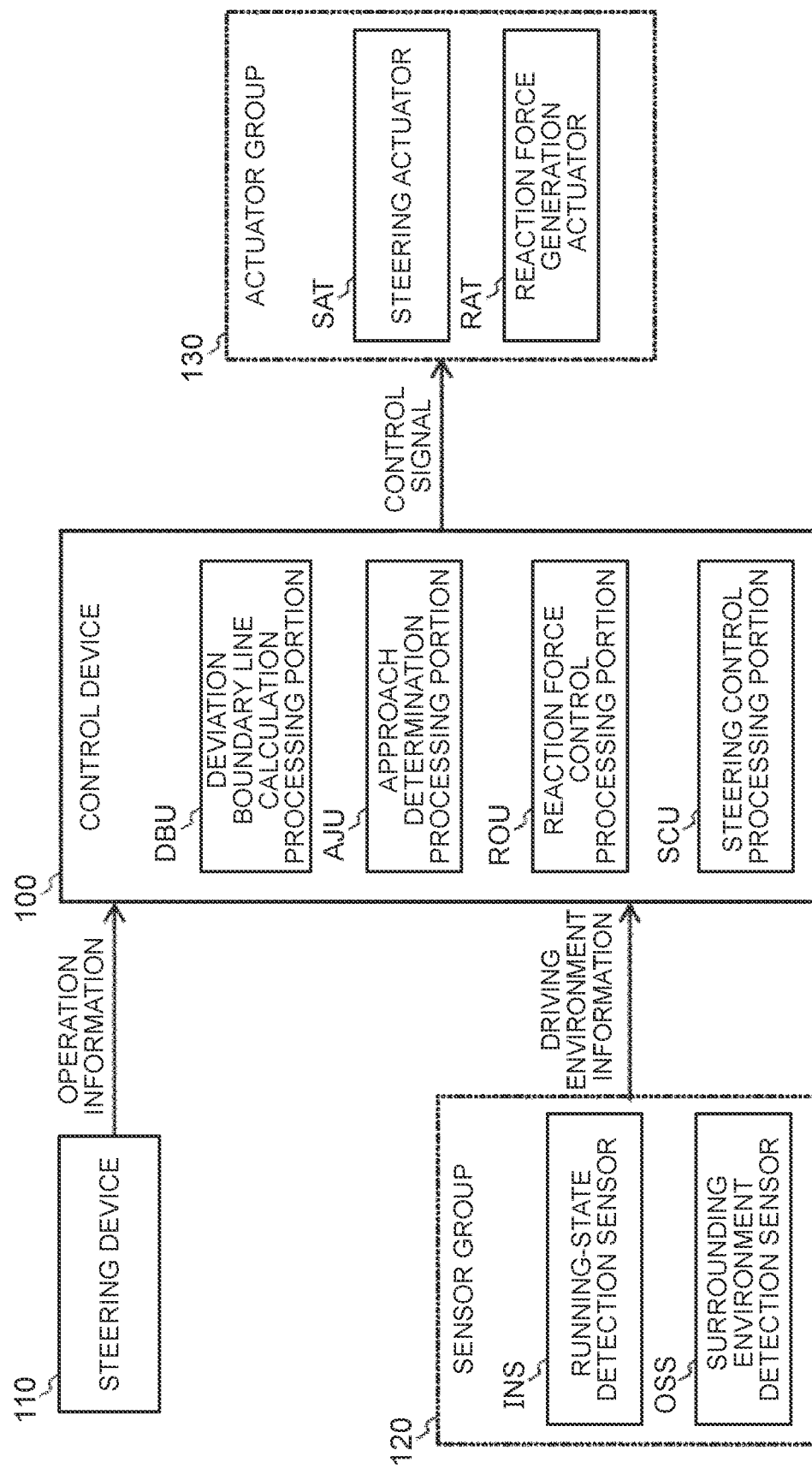
FIG. 5 is a block diagram illustrating a configuration of a driving assist system according to the present embodiment.

FIG. 5 is a block diagram illustrating a configuration of a driving assist system 10 according to the present embodiment. The driving assist system 10 includes a control device 100, a steering device 110, a sensor group 120, and an actuator group 130. The control device 100 is configured to be communicable with the steering device 110, the sensor group 120, and the actuator group 130 about information. Typically, the control device 100 is electrically connected to the steering device 110, the sensor group 120, and the actuator group 130 via a wire harness.

The steering device 110 is a device via which an operation for steering of the vehicle 1 is input. Typically, the steering device 110 is a steering wheel provided in the vehicle 1. Note that, in a case where a driving operation on the vehicle 1 is performed remotely, the steering device 110 may be an external device communicating with the vehicle 1. Operation information input into the steering device 110 is transmitted to the control device 100.

The sensor group 120 is a group of sensors configured to detect and output information (driving environment information) indicative of a driving environment around the vehicle 1. The driving environment information detected by the sensor group 120 is transmitted to the control device 100. The sensor group 120 includes a running-state detection sensor INS and a surrounding environment detection sensor OSS.

The running-state detection sensor INS detects a running state (a vehicle speed, an acceleration, a yaw rate, and so on) of the vehicle 1. The running-state detection sensor INS is, for example, a wheel speed sensor configured to detect the vehicle speed of the vehicle 1, an acceleration sensor configured to detect the acceleration of the vehicle 1, an angular velocity sensor configured to detect the yaw rate of the vehicle 1, or the like.

The surrounding environment detection sensor OSS detects information on an environment (a lane, an obstacle, a leading vehicle, and so on) around the vehicle 1. The surrounding environment detection sensor OSS is, for example, a millimeter wave radar, a camera, a light detection and ranging (LiDAR) system, or the like. Particularly, the surrounding environment detection sensor OSS detects information on a recognized object around the vehicle 1. The information on the recognized object is, for example, the distance between the vehicle 1 and the recognized object, the shape of the recognized object, or the like.

Note that the sensor group 120 may include a sensor configured to detect other pieces of driving environment information. Further, the driving environment information to be output from the sensor group 120 may include information to be provided by computing processing based on information directly detected by the sensors, in addition to the information directly detected by the sensors. For example, the driving environment information may include information on a type (a wall, a curb a stone, a pole, an on-the-street parking vehicle) of the recognized object that is provided based on the information on the recognized object, or the like. In this case, the computing processing may be executed by each sensor, or the sensor group 120 may include a device configured to execute the computing processing.

The control device 100 executes various processes for the control on the vehicle 1 based on acquired information so as to generate and output a control signal. The control signal output from the control device 100 is transmitted to the actuator group 130. The control device 100 is typically provided in the vehicle 1. However, the control device 100 may be an external device provided outside the vehicle 1. In this case, the control device 100 acquires information and outputs a control signal via communication with the vehicle 1.

The control device 100 is typically an electronic control unit (ECU) including a memory and a processor. The memory includes a random access memory (RAM) in which data is stored temporarily, and a read only memory (ROM) in which a program executable by the processor and various pieces of data for the program are stored. Information acquired by the control device 100 is stored in the memory. The processor reads out the program from the memory and executes a process in accordance with the program based on various pieces of data read out from the memory.

The control device 100 includes a deviation boundary line calculation processing portion DBU, an approach determination processing portion AJU, a reaction force control processing portion ROU, and a steering control processing portion SCU.

The deviation boundary line calculation processing portion DBU executes a process of calculating the deviation boundary line DBL for the object OBJ around the vehicle 1 such that the deviation boundary line DBL is set at a predetermined position distanced from the object OBJ.

The approach determination processing portion AJU executes a process of determining whether the vehicle 1 is traveling in the direction to approach the deviation boundary line DBL or not.

The reaction force control processing portion ROU executes a process of generating a control signal to generate a reaction force to the operation on the steering device 110.

The steering control processing portion SCU executes a process for the steering control on the vehicle 1 and generates a control signal for the steering control.

The control device 100 may execute processes for other controls on the vehicle 1. Note that the deviation boundary line calculation processing portion DBU, the reaction force control processing portion ROU, and the steering control processing portion SCU, or respective portions configured to execute the processes for other controls on the vehicle 1 may be constituted as part of one program or may be constituted by separate programs per process or per process group and executed by separate processors. Alternatively, they may be configured to be executed by separate ECUS per process or per process group. In this case, the control device 100 is a system constituted by a plurality of ECUS, and the ECUS are configured to be communicable with each other about information such that the ECUS can acquire necessary information to execute respective processes.

The actuator group 130 is a group of actuators configured to operate in accordance with control signals given by the control device 100. Various actuators included in the actuator group 130 operate in accordance with the control signals, so that various controls on the vehicle 1 by the control device 100 are implemented. The actuator group 130 includes a steering actuator SAT and a reaction force generation actuator RAT.

The steering actuator SAT is an actuator configured to drive a steering mechanism of the vehicle 1. When the steering actuator SAT operates, the steering of the vehicle 1 is implemented.

The reaction force generation actuator RAT is an actuator configured to generate a reaction force to the steering device 110. When the reaction force generation actuator RAT operates, a reaction force is generated to the operation on the steering device 110.

Note that the actuator group 130 may include other actuators. For example, the actuator group 130 may include an actuator configured to drive an engine (an internal combustion engine, an electric motor, or a hybrid thereof or the like), an actuator configured to drive a brake mechanism provided in the vehicle 1, and so on.

3. Process 3-1. Procedure of Driving Assist Process

Figure 6:
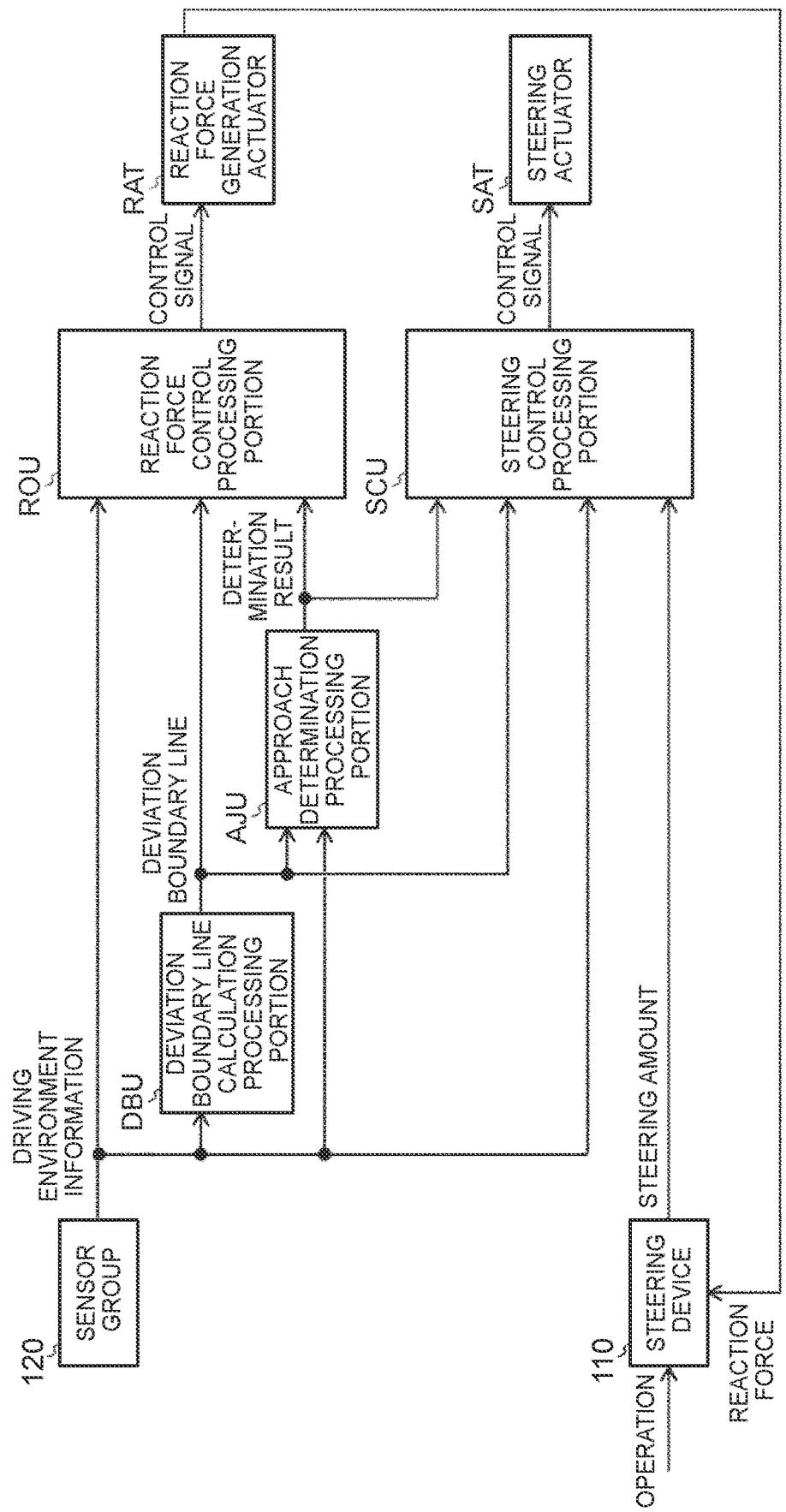
FIG. 6 is a block diagram illustrating the procedure of a driving assist process to be implemented by the driving assist system according to the present embodiment.

FIG. 6 is a block diagram illustrating the procedure of a driving assist process to be implemented by the control device 100 according to the present embodiment.

The deviation boundary line calculation processing portion DBU calculates a deviation boundary line DBL to a recognized object around the vehicle 1 based on driving environment information acquired from the sensor group 120. Here, the deviation boundary line DBL is generated such that the deviation boundary line DBL is set at a position distance only by a predetermined distance from the object OBJ as the recognized object. Alternatively, the deviation boundary line DBL is generated such that the deviation boundary line DBL is set at a position indicative of a boundary where a time-to-collision (TTC) of the vehicle 1 to the object OBJ is a predetermined value or less. At this time, the predetermined distance or the predetermined TTC may be given to a program in advance or may be given at any time based on the driving environment information. In this case, different distances or different TTC may be provided in accordance with the type of the object OBJ.

Further, in a case where a plurality of recognized objects is present around the vehicle 1, respective deviation boundary lines DBL may be calculated for the recognized objects, or the deviation boundary line DBL may be calculated for one or some of the recognized objects that satisfy a specific condition. For example, the deviation boundary line DBL may be calculated only for a recognized object having a length continuing to a given degree, e.g., a wall, a guard rail, or the like.

The approach determination processing portion AJU determines whether the vehicle 1 is traveling in the direction to approach the deviation boundary line DBL or not, based on the driving environment information acquired from the sensor group 120 and the deviation boundary line DBL acquired from the deviation boundary line calculation processing portion DBU. Then, the approach determination processing portion AJU outputs a determination result. For example, in a case where the posture of the vehicle 1 faces a direction toward the deviation boundary line DBL and the speed of the vehicle 1 is detected from information on the running state of the vehicle 1, the approach determination processing portion AJU determines that the vehicle 1 is traveling in the direction to approach the deviation boundary line DBL.

The reaction force control processing portion ROU generates a control signal to generate a reaction force to the operation on the steering device 110 based on the driving environment information acquired from the sensor group 120, the deviation boundary line DBL acquired from the deviation boundary line calculation processing portion DBU, and the determination result acquired from the approach determination processing portion AJU. More specifically, in a case where the vehicle 1 is traveling in the direction to approach the deviation boundary line DBL, the reaction force control processing portion ROU generates a control signal to generate a reaction force to the operation on the steering device 110 in the direction to approach the deviation boundary line DBL such that the reaction force corresponds to the relative position of the vehicle 1 to the deviation boundary line DBL. Note that no reaction force is generated to the operation on the steering device 110 in the direction to separate from the deviation boundary line DBL.

Figure 7:
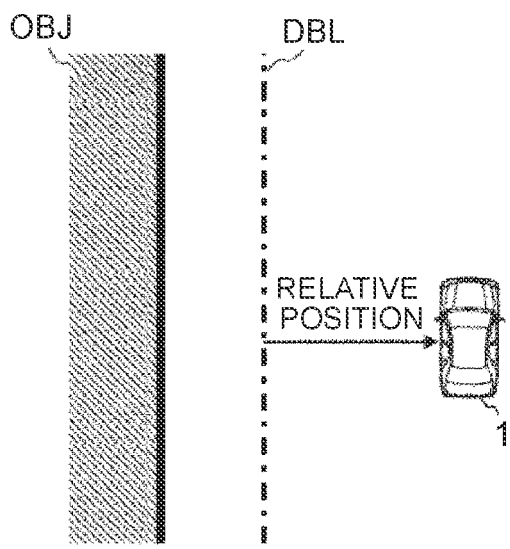
FIG. 7 is a graph illustrating an example of a reaction force to be generated by a reaction force control processing portion such that the reaction force corresponds to a relative position of the vehicle to a deviation boundary line.
Figure 7:
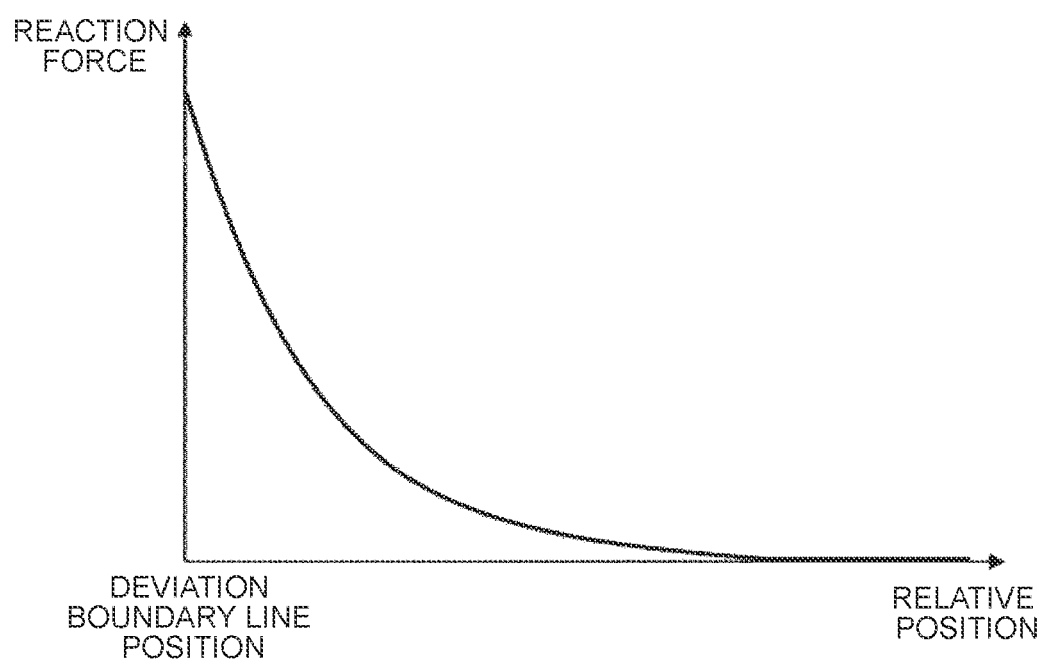

FIG. 7 is a graph illustrating an example of a reaction force to be generated by the reaction force control processing portion ROU such that the reaction force corresponds to the relative position of the vehicle 1 to the deviation boundary line DBL. As illustrated in FIG. 7, the reaction force to be generated by the reaction force control processing portion ROU is larger as the vehicle 1 approaches the deviation boundary line DBL. Note that the graph indicative of values of the reaction force at respective relative positions illustrated in FIG. 7 is an example. The reaction force to be generated to correspond to the relative position of the vehicle 1 to the deviation boundary line DBL is not limited in particular, provided that the reaction force is larger as the vehicle 1 approaches the deviation boundary line DBL. For example, a reaction force proportional to the relative position may be generated, or a reaction force may be generated such that the shape of the graph of the reaction force projects upward. In this case, the reaction force to be generated may be determined optimally for the vehicle 1 to which the driving assist system 10 according to the present embodiment is applied, by experiment based on vehicle compatibility or the like.

Now refer back to FIG. 6. The reaction force generation actuator RAT operates in accordance with the control signal generated by the reaction force control processing portion ROU and applies a reaction force to the steering device 110.

The steering device 110 outputs an operation amount of the operation input therein. The operation amount indicates a torque given to the steering wheel, for example. At this time, in a case where the operation on the steering device 110 is an operation in the direction to approach the deviation boundary line DBL, a reaction force is generated to the operation by the reaction force control processing portion ROU. Accordingly, the operation amount in the direction to approach the deviation boundary line DBL is an operation amount of an operation input against the reaction force.

In a case where the vehicle 1 is traveling in the direction to approach the deviation boundary line DBL and in a case where the operation in the direction to separate from the deviation boundary line DBL is not performed and the operation amount of the steering device 110 is less than a predetermined threshold, the steering control processing portion SCU generates a control signal to control the steering of the vehicle 1 based on the driving environment information acquired from the sensor group 120, the deviation boundary line DBL acquired from the deviation boundary line calculation processing portion DBU, and the determination result acquired from the approach determination processing portion AJU, such that the vehicle 1 does not cross the deviation boundary line DBL. Due to the control by the steering control processing portion SCU, the vehicle 1 runs along the deviation boundary line DBL without crossing the deviation boundary line DBL, until the steering device 110 is operated in the direction to separate from the deviation boundary line DBL, or until an operation by which the operation amount reaches the threshold or more is performed in the direction to approach the deviation boundary line DBL against the reaction force.

In a case where the steering control processing portion SCU does not execute the above control, the steering control processing portion SCU generates a control signal such that the steering of the vehicle 1 is performed in accordance with a steering amount. At this time, the driving operation on the vehicle 1 by the driver is performed. That is, the steering control processing portion SCU has an adjustment function to adjust which control signal is to be generated, a control signal to perform the steering of the vehicle 1 by the steering control or a control signal to perform the steering in accordance with the steering amount.

The steering actuator SAT operates in accordance with the control signal generated by the steering control processing portion SCU such that the steering of the vehicle 1 is performed.

Note that, in a case where a plurality of deviation boundary lines DBL is calculated, respective processes to obtain the determination result by the approach determination processing portion AJU, the reaction force by the reaction force control processing portion ROU, and the steering control by the steering control processing portion SCU may be performed for each of the deviation boundary lines DBL.

3-2. Process to be Executed by Control Device

Figure 8:
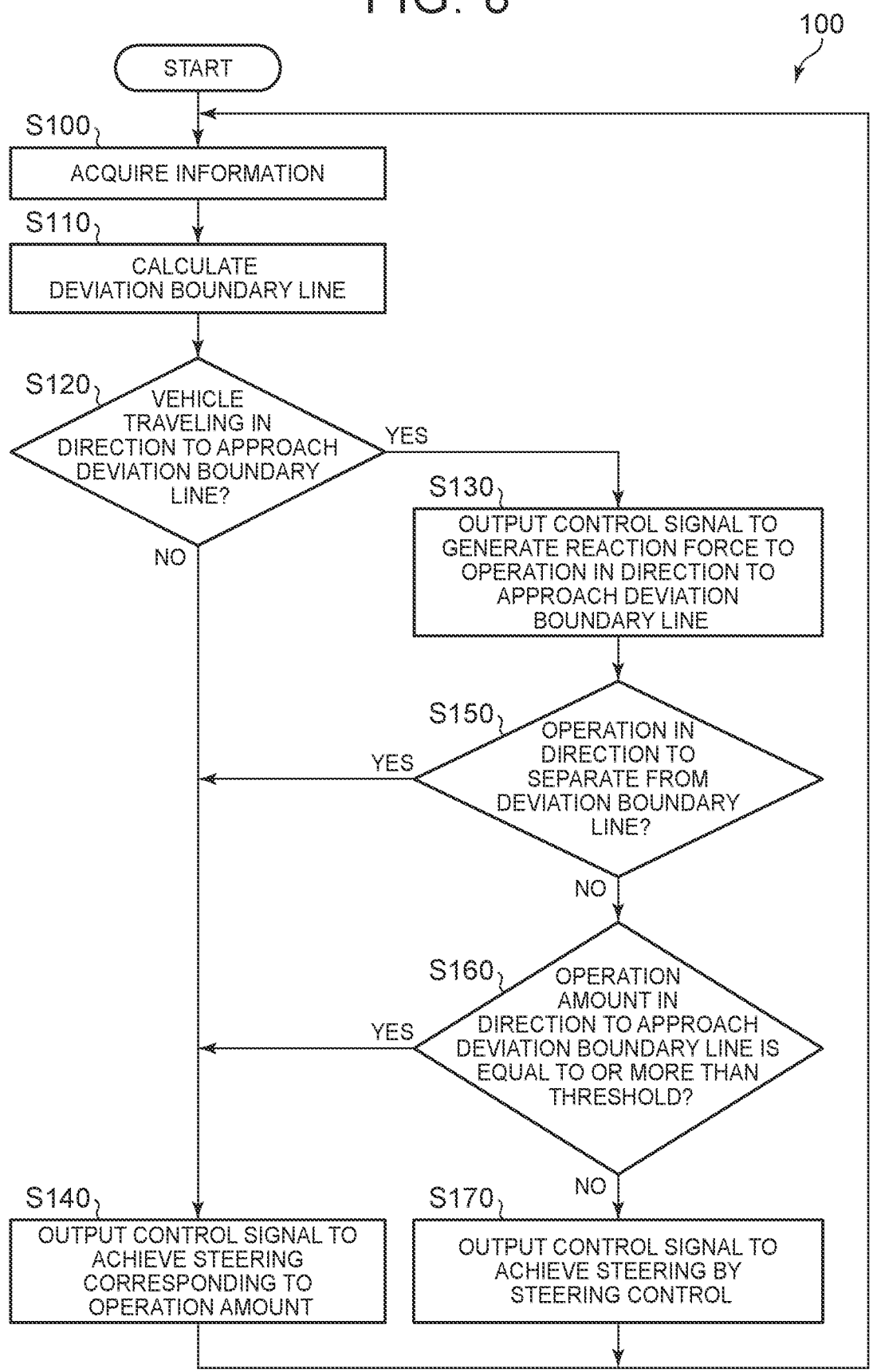
FIG. 8 is a flowchart illustrating a process to be executed by the control device according to the present embodiment.

FIG. 8 is a flowchart illustrating a process to be executed by the control device 100 according to the present embodiment. The process illustrated in FIG. 8 is started when a recognized object around the vehicle 1 is detected by the sensor group 120. When no recognized object is detected, the process illustrated in FIG. 8 is ended.

In step S100, the control device 100 acquires information necessary for the process. The control device 100 acquires at least operation information on the steering device 110 and driving environment information (including information on the running state and information on the environment around the vehicle 1) detected by the sensor group 120.

After step S100, the process proceeds to step S110.

In step S110, the control device 100 calculates the deviation boundary line DBL to the recognized object around the vehicle 1 based on the pieces of information thus acquired.

After step S110, the process proceeds to step S120.

In step S120 (an approach determination process), the control device 100 determines whether the vehicle 1 is traveling in the direction to approach the deviation boundary line DBL or not, based on the pieces of information thus acquired.

In a case where the vehicle 1 is traveling in the direction to approach the deviation boundary line DBL (step S120: Yes), the process proceeds to step S130. In a case where the vehicle 1 is not traveling in the direction to approach the deviation boundary line DBL (step S120: No), the process proceeds to step S140.

In step S130, the control device 100 outputs a control signal to generate a reaction force to the operation on the steering device 110 in the direction to approach the deviation boundary line DBL such that the reaction force corresponds to the relative position of the vehicle 1 to the deviation boundary line DBL.

After step S130, the process proceeds to step S150.

In step S140, the control device 100 outputs a control signal to perform steering in accordance with the steering amount of the steering device 110. That is, the driving operation on the vehicle 1 by the driver is performed.

After a predetermined control period has passed after step S140, the process returns to step S100, and then, the process is repeated.

In step S150 (a first operation determination process), the control device 100 determines whether the operation on the steering device 110 in the direction to separate from the deviation boundary line DBL is performed or not.

In a case where the operation on the steering device 110 in the direction to separate from the deviation boundary line DBL is performed (step S150: Yes), the process proceeds to step S140. That is, when the steering device 110 is operated in the direction to separate from the deviation boundary line DBL, the driving operation on the vehicle 1 by the driver is performed. At this time, the operation on the steering device 110 is the operation in the direction to separate from the deviation boundary line DBL, so that the driver does not feel a reaction force. In a case where the operation on the steering device 110 in the direction to separate from the deviation boundary line DBL is not performed (step S150: No), the process proceeds to step S160.

In step S160 (a second operation determination process), the control device 100 determines whether or not the operation amount of the operation on the steering device 110 in the direction to approach the deviation boundary line DBL is equal to or more than a predetermined threshold.

In a case where the operation amount of the operation on the steering device 110 in the direction to approach the deviation boundary line DBL is equal to or more than the predetermined threshold (step S160: Yes), the process proceeds to step S140. This corresponds to a case where the operation on the steering device 110 in the direction to approach the deviation boundary line DBL is performed to a given degree against the reaction force. In a case where the operation amount is the predetermine threshold or less (step S160: No), the process proceeds to step S170.

In step S170, the control device 100 outputs a control signal to perform steering by the steering control. That is, the steering of the vehicle 1 is controlled such that the vehicle 1 does not cross the deviation boundary line DBL.

After a predetermined control period has passed after step S170, the process returns to step S100, and then, the process is repeated.

Due to the process illustrated in FIG. 8, the driving assist for the vehicle 1 that has been described in FIG. 4 is implemented. Note that, in terms of the flowchart illustrated in FIG. 8, step S110 is executed by the deviation boundary line calculation processing portion DBU, step S120 is executed by the approach determination processing portion AJU, step S130 is executed by the reaction force control processing portion ROU, and steps S140 to S170 are executed by the steering control processing portion SCU.

4. Effects

As described above, the control device 100 according to the present embodiment calculates the deviation boundary line DBL to the recognized object around the vehicle 1. When the vehicle 1 is traveling in the direction to approach the deviation boundary line DBL, a reaction force is generated to the operation in the direction to approach the deviation boundary line DBL. Hereby, it is possible to restrain a driver's unintentional operation on the steering device 110. As a result, it is possible to improve safety for the vehicle.

Further, in a case where the vehicle 1 is traveling in the direction to approach the deviation boundary line DBL and in a case where the operation in the direction to separate from the deviation boundary line DBL is not performed and the operation amount of the steering device 110 is less than the predetermined threshold, the steering of the vehicle 1 is controlled such that the vehicle 1 does not cross the deviation boundary line DBL. Hereby, it is possible to restrain the driver from unintentionally causing the vehicle 1 to approach the object OBJ around the vehicle 1.

5. Modifications

The control device 100 according to the present embodiment may employ the following modified forms. Note that a redundant part overlapped with what is described in the above description is omitted appropriately.

5-1. Modification 1

The control device 100 according to the present embodiment may be configured to switch between the aforementioned control (hereinafter also referred to as a "reaction force steering control") including the reaction force control and the steering control and the steering control in the related art (hereinafter also referred to as a "conventional steering control"), in accordance with the type of the recognized object detected by the sensor group 120. In this case, the control device 100 may be configured as follows. That is, in a case where the recognized object is a type (e.g., a wall, a guard rail, or the like) which does not allow the vehicle 1 to run across the recognized object or which presumably does not allow the vehicle 1 to run, the control device 100 may execute the reaction force steering control, and in other cases, the control device 100 may execute the conventional steering control. For example, in a case where the object OBJ as the recognized object is a type such as a low step or a white line that allows the vehicle 1 to run across the object OBJ, the control device 100 executes the conventional steering control.

The configuration of the driving assist system 10 according to Modification 1 of the present embodiment and the procedure of the driving assist process to be implemented by the control device 100 may be equivalent to those illustrated in FIGS. 5, 6. However, in a case where the recognized object is a type for which the reaction force steering control is not executed, the reaction force control processing portion ROU does not execute the reaction force control. Further, the steering control processing portion SCU executes the reaction force steering control or the conventional steering control in a switching manner in accordance with the type of the recognized object. Note that the operation position for the conventional steering control may be the deviation boundary line DBL calculated by the deviation boundary line calculation processing portion DBU or may be different from the deviation boundary line DBL. In a case where the operation position for the conventional steering control is different from the deviation boundary line DBL, the operation position may be generated by the steering control processing portion SCU.

Figure 9:
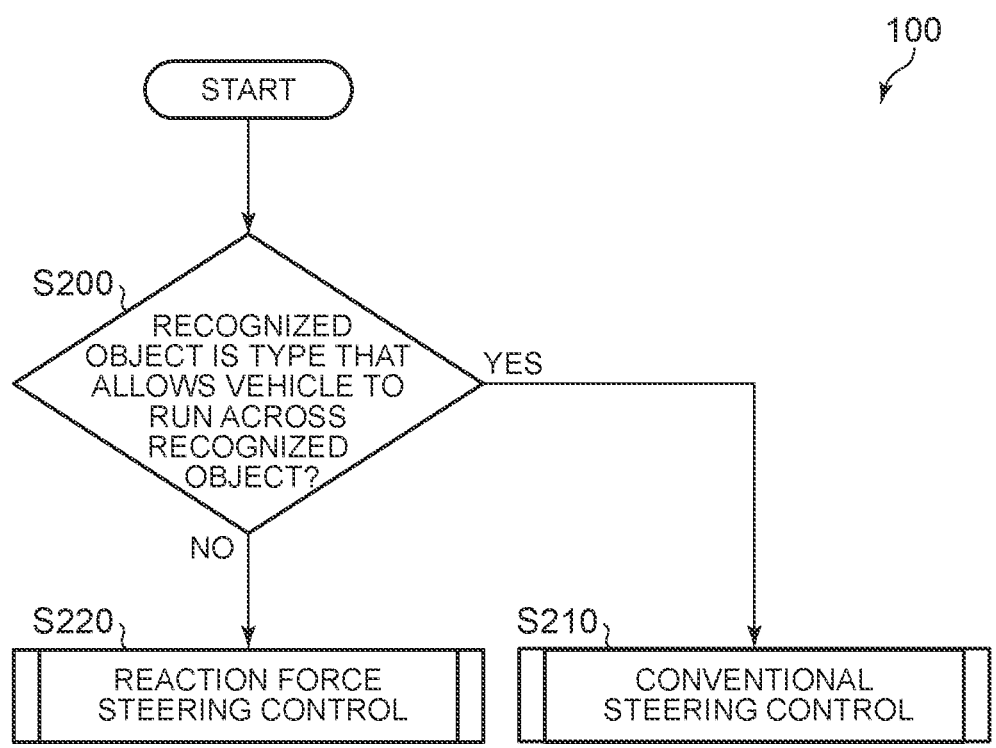
FIG. 9 is a flowchart illustrating a process to be executed by a control device according to Modification 1 of the present embodiment.

FIG. 9 is a flowchart illustrating a process to be executed by the control device 100 according to Modification 1 of the present embodiment. The process illustrated in FIG. 9 is started when a recognized object around the vehicle 1 is detected by the sensor group 120. When no recognized object is detected, the process illustrated in FIG. 9 is ended.

In step S200, the control device 100 determines whether or not the type of the recognized object thus detected is a type that allows the vehicle 1 to run across the recognized object. The determination may be performed as follows. That is, types of recognized objects that allow the vehicle 1 to run across them may be given to a program in advance, and the control device 100 may determine whether the recognized object corresponds to any of the types or not. Alternatively, the control device 100 may perform the determination specifically based on information on the shape or the like of the recognized object detected by the sensor group 120.

In a case where the vehicle 1 can run across the recognized object thus detected (step S200: Yes), the process proceeds to step S210, and the conventional steering control is executed. In a case where the vehicle 1 cannot run across the detected recognized object (step S200: No), the process proceeds to step S220, and the reaction force steering control is executed. Note that a process for the reaction force steering control to be executed in step S220 is equivalent to the process described in FIG. 8.

With such a modified configuration, by performing the conventional steering control in a case where the recognized object allows the vehicle 1 to approach the recognized object from the viewpoint of safety or the like, it is possible to reduce troubles to be given to the driver without generating a reaction force to the operation on the steering device 110.

5-2. Modification 2

The control device 100 according to the present embodiment may be configured such that the steering control processing portion SCU executes the conventional steering control instead of the steering control by which the vehicle 1 is prevented from crossing the deviation boundary line DBL.

Figure 10:
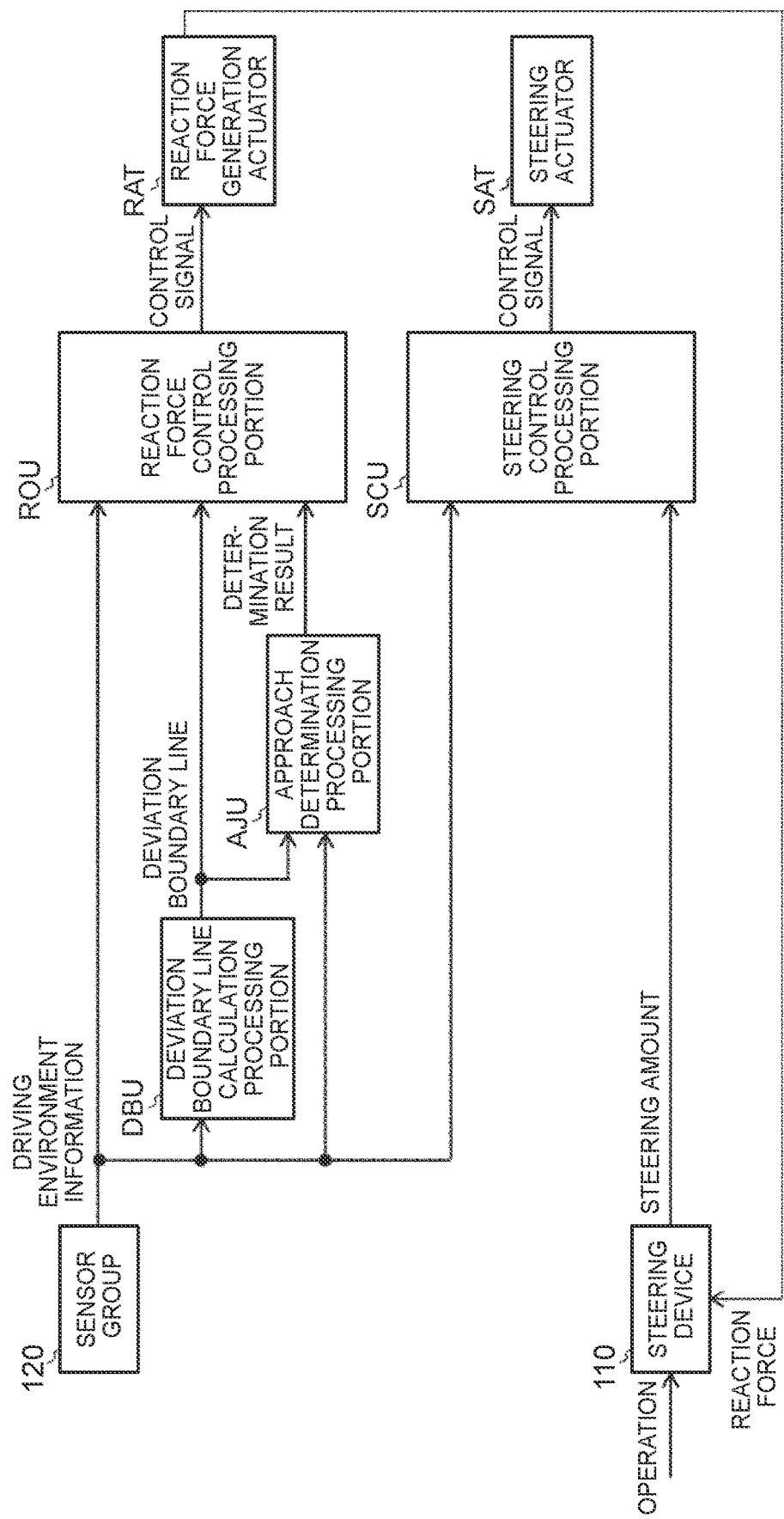
FIG. 10 is a block diagram illustrating the procedure of a driving assist process to be executed by a control device according to Modification 2 of the present embodiment.

FIG. 10 is a block diagram illustrating the procedure of the driving assist process to be implemented by the control device 100 according to Modification 2 of the present embodiment. As illustrated in FIG. 10, in the driving assist process according to Modification 2, it is not necessary for the steering control processing portion SCU to acquire information on the deviation boundary line DBL and the determination result. That is, the steering control processing portion SCU executes the process independently from the deviation boundary line calculation processing portion DBU, the approach determination processing portion AJU, and the reaction force control processing portion ROU. Note that, in the conventional steering control to be executed by the steering control processing portion SCU, in a case where the operation position is set to the deviation boundary line DBL calculated by the deviation boundary line calculation processing portion DBU, the deviation boundary line DBL may be acquired from the deviation boundary line calculation processing portion DBU.

Figure 11:
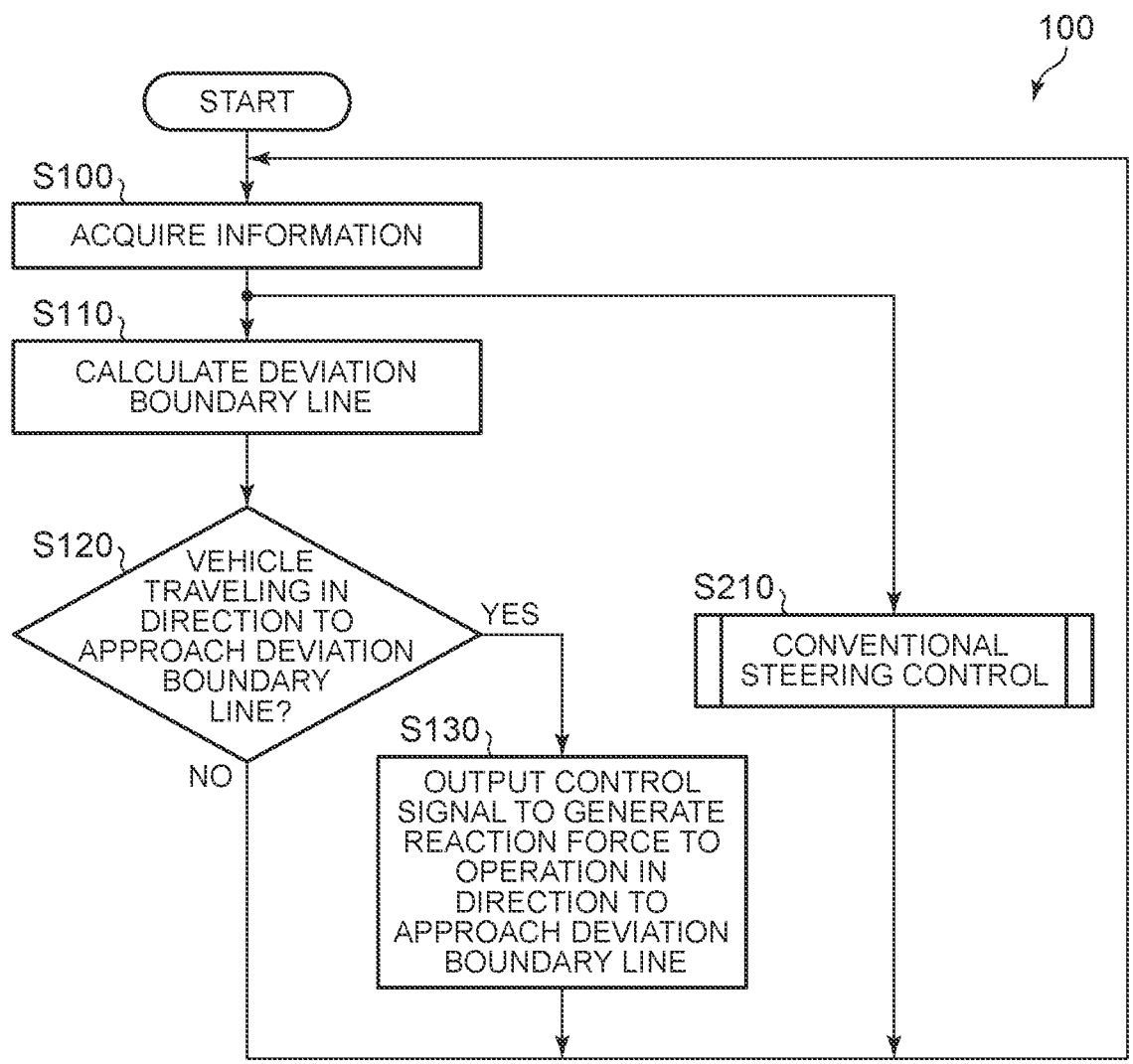
FIG. 11 is a flowchart illustrating a process to be executed by the control device according to Modification 2 of the present embodiment.

FIG. 11 is a flowchart illustrating a process to be executed by the control device 100 according to Modification 2 of the present embodiment. As illustrated in FIG. 11, in Modification 2 according to the present embodiment, a process (step S210) for the conventional steering control is executed independently from a control (steps S110 to S130) by which a reaction force is generated to the operation on the steering device 110.

Figure 12:
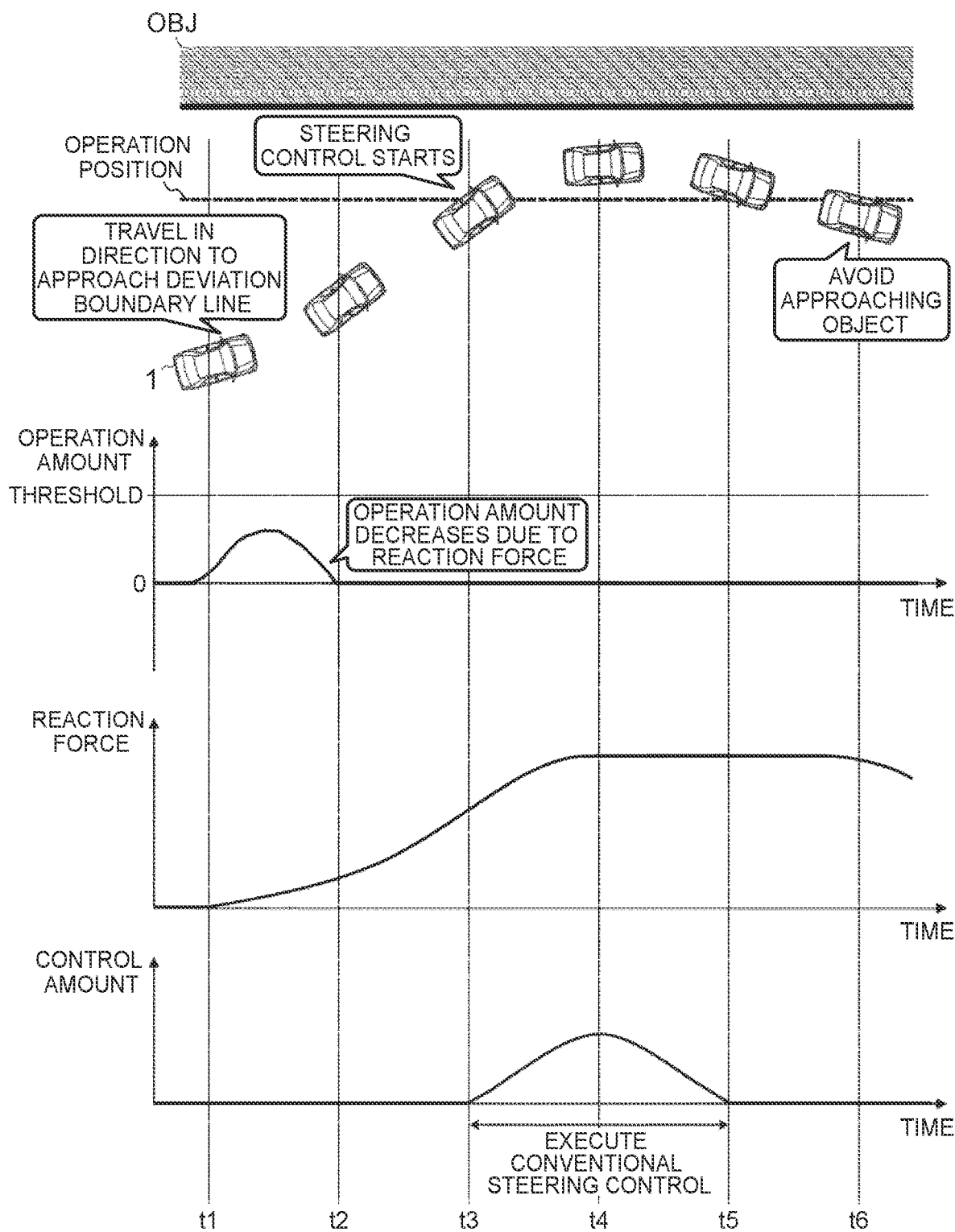
FIG. 12 is a conception diagram to describe an outline of a control to be executed by the control device according to Modification 2 of the present embodiment.

FIG. 12 is a conception diagram to describe an outline of the control to be executed by the control device 100 according to Modification 2 of the present embodiment. Constituents of FIG. 12 are equivalent to those of FIG. 4. As illustrated in FIG. 12, when a reaction force is generated to the operation on the steering device 110, a driver's unintentional operation on the steering device 110 is restrained, so that the conventional steering control can be executed without override (time t3 to time t5). As such, by employing Modification 2, it is possible to achieve an effect equivalent to that of the control device 100 according to the present embodiment.

5-3. Modification 3

The recognized object detected by the sensor group 120 in the present embodiment is one type of information on the environment around the vehicle 1. The information on the environment includes information on the structure of a road such as a shoulder, a hollow, or a scarp, or information on a road state such as a state where the road is just after paving or a state where the road is covered with snow. These pieces of information may be acquired from map information or road traffic information.

What is claimed is:

1. A control device for executing a control for driving assist for a vehicle, the control device comprising a processor configured to execute:
    a process of acquiring information on an environment around the vehicle, the information on the environment around the vehicle includes information on a state of a road after paving or covered with snow;
    a process of acquiring information on a running state of the vehicle;
    a process of generating a deviation boundary line such that the deviation boundary line is set at a position indicative of a boundary where a time-to-collision of the vehicle to a recognized object around the vehicle is a predetermined value or less;
    an approach determination process of determining whether the vehicle is traveling in a direction to approach the deviation boundary line or not, where a posture of the vehicle faces the direction toward deviation boundary line and a speed of the vehicle is detected from the information on the running state;
    a process of generating a reaction force to an operation on a steering device of the vehicle by a driver in the direction to approach the deviation boundary line such that the reaction force corresponds to a relative position of the vehicle to the deviation boundary line, the process being executed in a case where an affirmative determination is made in the approach determination process;

a first operation determination process of determining whether the operation on the steering device in a direction to separate from the deviation boundary line is performed or not;

a second operation determination process of determining whether or not an operation amount of the operation on the steering device in the direction to approach the deviation boundary line is equal to or more than a predetermined threshold; and a process of controlling steering of the vehicle such that the vehicle does not cross the deviation boundary line, the process being executed in a case where an affirmative determination is made in the approach determination process and a negative determination is made in the first operation determination process and the second operation determination process.

2. A control method for controlling driving assist for a vehicle, the control method comprising:

a process of acquiring information on an environment around the vehicle, the information on the environment around the vehicle includes information on a state of a road after paving or covered with snow;

a process of acquiring information on a running state of the vehicle;

a process of generating a deviation boundary line such that the deviation boundary line is set at a position indicative of a boundary where a time-to-collision of the vehicle to a recognized object around the vehicle is a predetermined value or less;

an approach determination process of determining whether the vehicle is traveling in a direction to approach the deviation boundary line or not, where a posture of the vehicle faces the direction toward deviation boundary line and a speed of the vehicle is detected from the information on the running state;

a process of generating a reaction force to an operation on a steering device of the vehicle by a driver in the direction to approach the deviation boundary line such that the reaction force corresponds to a relative position of the vehicle to the deviation boundary line, the process being executed in a case where an affirmative determination is made in the approach determination process;

a first operation determination process of determining whether the operation on the steering device in a direction to separate from the deviation boundary line is performed or not;

a second operation determination process of determining whether or not an operation amount of the operation on the steering device in the direction to approach the deviation boundary line is equal to or more than a predetermined threshold; and a process of controlling steering of the vehicle such that the vehicle does not cross the deviation boundary line, the process being executed in a case where an affirmative determination is made in the approach determination process and a negative determination is made in the first operation determination process and the second operation determination process.

3. A non-transitory storage medium that stores a control program causing a computer to execute the control method according to claim 2.

4. The control device according to claim 1, wherein the processor is further configured to execute:

a process of determining whether or not a type of the recognized object detected is a type that allows the vehicle to run across the recognized object; and a process of generating the reaction force to the operation on the steering device of the vehicle by the driver in the direction to approach the deviation boundary line such that the reaction force corresponds to the relative position of the vehicle to the deviation boundary line, the process being executed in a case where a negative determination is made in the approach determination process.

5. The control method according to claim 2, further comprising:

a process of determining whether or not a type of the recognized object detected is a type that allows the vehicle to run across the recognized object; and a process of generating the reaction force to the operation on the steering device of the vehicle by the driver in the direction to approach the deviation boundary line such that the reaction force corresponds to the relative position of the vehicle to the deviation boundary line, the process being executed in a case where a negative determination is made in the approach determination process.

\* \* \* \* \*